Nov. 10, 1953 — A. RIZO-PATRÓN R. — 2,658,827
METHOD OF RECOVERING PRECIOUS AND BASE METALS
Filed April 12, 1950

INVENTOR.
Alfonso Rizo-Patrón R.
BY
ATTYS.

Nov. 10, 1953 — A. RIZO-PATRÓN R. — 2,658,827
METHOD OF RECOVERING PRECIOUS AND BASE METALS
Filed April 12, 1950 — 7 Sheets-Sheet 6

INVENTOR.
Alfonso Rizo-Patrón R.

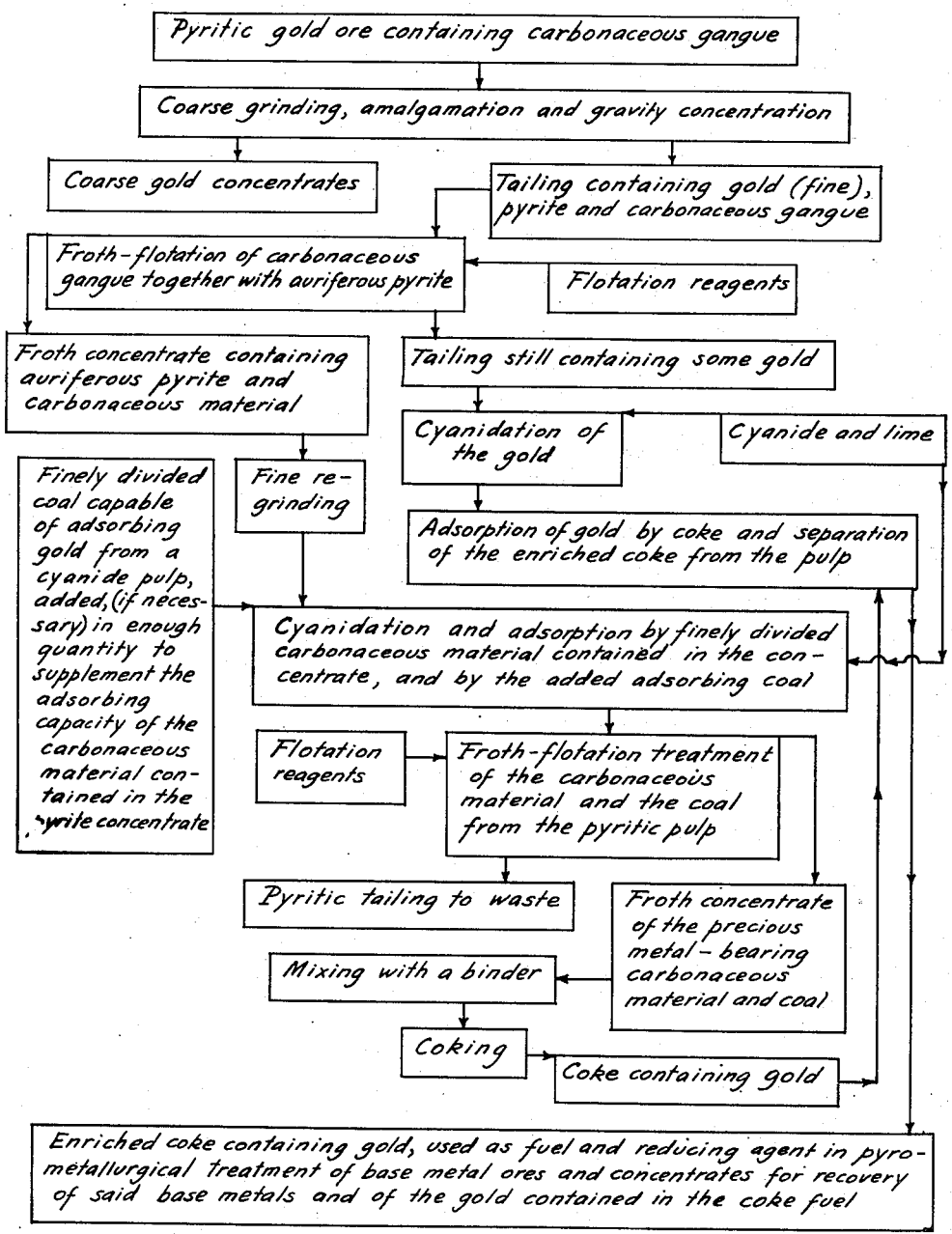

Patented Nov. 10, 1953

2,658,827

UNITED STATES PATENT OFFICE 2,658,827

METHOD OF RECOVERING PRECIOUS AND BASE METALS

Alfonso Rizo-Patrón R., San Isidro, Lima, Peru

Application April 12, 1950, Serial No. 155,415

8 Claims. (Cl. 75—2)

This invention relates to the recovery, in a combined operation, of precious metals such as gold and silver from their ores, tailings or concentrates; and of base metals such as lead, copper and zinc from their ores or concentrates.

The invention is applicable to a wide variety of gold and silver ores, tailings and concentrates of those ores, in which the precious metals occur as the only commercial values, when their treatment can be combined with the treatment of base metal ores or concentrates.

The invention is also applicable to a wide variety of complex ores in which gold and silver occur together with minerals of base metals; particularly when the metallurgical concentration of the base metals, as well as the extraction by cyanidation of the precious metals, is economically possible. That is, the invention may be advantageously applied to such ores both for the recovery of the gold and silver ingredients and for the recovery of the base metals, in a combined treatment.

The invention may also be advantageously applied to gold and silver ores and tailings and concentrates of those ores containing graphitic or other carbonaceous gangues, and is particularly useful when employed in connection with the beneficiation of other ores or concentrates of base metals.

The general object of the invention is the economical recovery, in a combined operation, of base metals (such as lead, copper and zinc) and precious metals (such as gold and silver) from any of the ores and tailings and concentrates of the kinds above mentioned.

As is well known, the cyanidation-with-carbon method of recovering gold and silver involves the dissolution of the gold and silver in an alkaline ore pulp by a cyanide, the (usually substantially simultaneous) adsorption of the gold and silver by activated or especially prepared charcoal or carbon, the removal of the gold and silver-bearing charcoal or carbon from the pulp, and the extraction of the gold and silver values therefrom by various methods. The amount of activated or especially prepared charcoal or carbon employed in such cyanidation methods of recovering gold and silver has always been small (less than ½% of the weight of the material cyanided) because of the high cost of activated or especially prepared charcoal or carbon; and efforts have been made to keep the quantity of such material required as low as possible, and to re-use such material for adsorption after the gold and silver values have been extracted from it, in order to make such methods competitive with other methods.

The methods hereinafter described, which embody the present invention, involve dissolution of the gold and silver constitutents of an ore, tailing or low-grade concentrate in an alkaline aqueous pulp by a cyanide as has been customery in prior art methods. But the gold and silver is adsorbed from the pulp, not by activated or especially prepared charcoal or carbon, but by a low-priced naturally-occurring low-volatile-matter coal which is capable of adsorbing gold and silver from cyanide solutions or ore pulps although such materials have a much lower adsorption power than activated or especially prepared charcoal and carbon. Examples of such low-priced naturally-occurring low-volatile-matter coals are anthracite coal particularly in fine sizes, impure graphitic coals, carbonaceous schists, coal shales and other naturally occurring low-volatile-matter coals. As hereinafter explained, anthracite coal is particularly useful in practicing the present invention. Owing to the fact that such low-priced naturally-occurring low-volatile-matter coals have a comparatively low adsorptive capacity, the weight of such material employed per ton of material cyanided, in practicing the present invention is far greater than the weight of the activated or especially prepared charcoal or carbon, per ton of material cyanided, commonly employed in the methods of the prior art. Adsorption of the gold and silver from cyanide pulps may be as completely accomplished by using such low-priced materials as by the use of specially prepared or activated charcoal and carbon. In fact the adsorption of the precious metals seems to be facilitated and more efficiently accomplished due to the far greater concentration per unit volume of the adsorbent material.

According to the present invention the said low-priced naturally-occurring low-volatile-matter coals serve not only to adsorb the gold and silver from the cyanide solution or pulp, but after removal from the latter is useful and is used as a fuel and reducing agent in later pyro-metallurgical operations usually in connection with customary pyro-metallurgical treatments of base-metal ores or concentrates thereof which may or may not contain gold and silver values. That is, the fuel material bearing precious metals, which is obtained after cyanidation in the practicing of the present invention, is useful and is used as a substantial and important part and even all of the fuel required in the sintering, nodulizing, volatilizing, distilling, smelting, or other pyro-metallurgical operations customarily applied to base metal ores or concentrates. Said precious metal-bearing fuel material takes the place of some or all of the coal, coke, charcoal, etc. customarily used as fuel in such pyro-metallurgical operations, and that is one of the reasons why the invention often results in appreciable savings in the total cost of the recovery treatments involved. The precious metals contained in the adsorbing fuel material which is thus used as fuel and reducing agent in the later pyro-metallurgical operations, become part of the sinters, nodules, clinkers, spent briquettes, bullions, mattes, etc. obtained by such operations, thereby enriching those products; and the gold and silver contained in the said products are eventually recovered as by-products in standard refining operations of the base metals. As used in this specification, the terms "fuel material" and "naturally low-volatile-matter coals" of course do not include activated or especially prepared charcoal or carbon which, as has been mentioned, has been used merely for the adsorption of precious metals from cyanide solutions and not as any important part of the fuel in any pyro-metallurgical operation.

Therefore, it will be apparent that the methods embodying the present invention involve the use of a naturally occurring low-volatile-matter coals capable of adsorbing precious metals from a cyanide solution or pulp, and its use later in its enriched form as a fuel and reducing agent in subsequent pyro-metallurgical treatments for the recovery of base metals as well as precious metals. It is this double use of the said coals both for the adsorbing of the precious metal values and as a fuel in the later treatments, that generally makes possible the use of such low-priced fuel materials, and thus often makes the methods of the present invention industrially more economical than the methods of the prior art. Furthermore, when the said coals are used in the form of particles capable of froth flotation concentration, it is often possible to achieve an effective concentration of the fuel material itself while separating it from the cyanide pulp after adsorption of the precious metals, thereby improving substantially its grade in comparison to its original condition when fed to the cyanide pulp. This permits the use of very impure and cheap coals occurring in nature, as an adsorbing material useful in cyanidation, and as a very cheap fuel in later metallurgical operations applied to base-metal ores or concentrates thereof.

In practicing the present invention, the said coals may be used in the form of lumps (or granules) or in the form of particles capable of froth-flotation concentration, or in both of these states. When lumps (or granules) of said coals are used, after they have adsorbed the precious metal values and have been removed from the pulp, they may be used as fuel in pyro-metallurgical operations. When said fuel material is used in the form of particles capable of froth-flotation concentration, the concentrates of such particles, after they have adsorbed the precious metal values and have been removed from the pulp, may be used in a variety of ways. For example, they may be used as fuel and reducing agent in pulverized form in pyro-metallurgical operations where such use is permitted; or they may be mixed with pulverized concentrates of base metals and formed into briquettes (with or without a binder) and such briquettes may be used in pyro-metallurgical operations, with or without previous coking. Or said coal concentrates containing precious metal values may be formed into fuel briquettes, with or without coking, or may be mixed with a binder and coked without previous briquetting, and may be used as a fuel in blast furnace smelting. Since coking the fuel material gives it adsorbing capacity, the coke thus obtained may be used again for the further adsorption of the precious metal values in the cyanidation treatment of the original feed. Thus it is apparent that the fuel material after adsorbing the precious metal values and removal from the pulp, may be used in different ways.

In practicing the invention, the weight, per ton of feed, of the fuel material employed for the adsorption of the precious metal values will vary considerably. Since the said fuel material is cheap in contrast to activated or especially prepared charcoal or carbon, economy in its use is not as important a factor in the cost of the entire operation as in prior art methods employing activated or especially prepared charcoal or carbon. The quantity of naturally-occurring low-volatile-matter coals employed for the adsorption of the precious metal values will depend upon the nature of the feed and the particular fuel material employed, and the proper quantity can be easily determined. Of course, sufficient of said material should be used to adsorb substantially all of the precious metal values. If more fuel material is used than is necessary for the substantially complete adsorption of the precious metal values, that is not a serious matter since the fuel material subsequently serves as at least an important part of the fuel employed in the later pyro-metallurgical treatments which have been mentioned. In practicing the invention, it will be found that the weight of the naturally-occurring low-volatile-matter coals employed for the adsorption of the precious metal values will practically always be greater than 1% of the weight of the precious metal ore, tailing or concentrate treated, and usually the percentage employed will be much higher.

From the foregoing, it will be apparent that the novelty in its broad aspect of the methods embodying the present invention resides in the use of a cheap naturally-occurring low-volatile-matter coals of the kind hereinbefore mentioned capable of adsorbing the precious metals from a cyanide pulp, and after removing the precious metal-bearing material from the pulp, in using said precious metal-bearing material as a substantial and important part of the fuel and reducing agent employed in a pyro-metallurgical treatment of ores and concentrates of base metals for the recovery of said base and precious metals.

The invention will be understood from the foregoing and following description taken in connection with the accompanying drawings in which:

Fig. 7 is a simplified flow-sheet showing the invention applied to a pyritic gold ore containing carbonaceous gangue.

Figure 1:
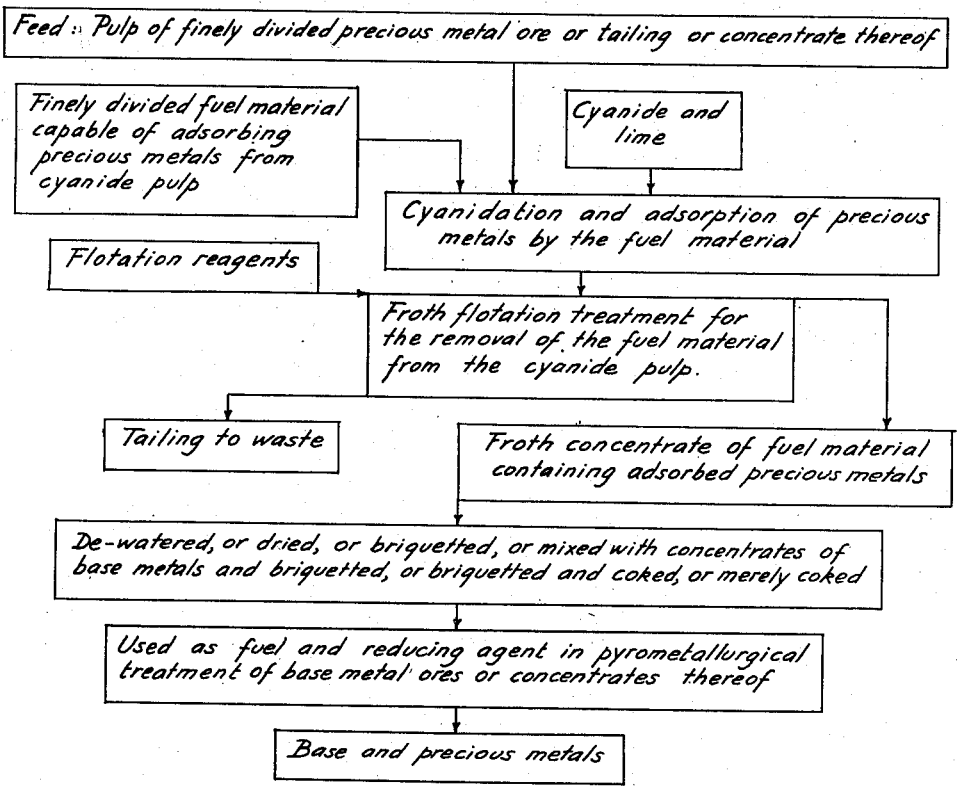
Fig. 1 is a simplified flow-sheet illustrating the invention.

Referring to Fig. 1, it will be apparent that the method embodying the invention, as there illustrated in simplified form, involves treatment of a feed consisting of a pulp of finely-divided precious metal ore or tailing or concentrate thereof in an alkaline pulp with a cyanide, lime and a finely-divided fuel material of the type hereinbefore mentioned capable of adsorbing precious metals. The pulp is then subjected to flotation treatment, with any suitable combination of reagents such as pine oil (as collector-frother) and sodium silicate (as dispersing agent) resulting in a froth concentrate of fuel material containing adsorbed precious metals, and in a tailing which is sent to waste. The concentrate of the fuel material containing adsorbed precious metals thus obtained after being dried or filtered, or briquetted, or mixed with concentrates of base metals and briquetted, or briquetted and coked, or merely coked, is used as fuel and reducing agent in a pyro-metallurgical treatment of ores or concentrates of base metals for the recovery of said base and precious metals.

Figure 2:
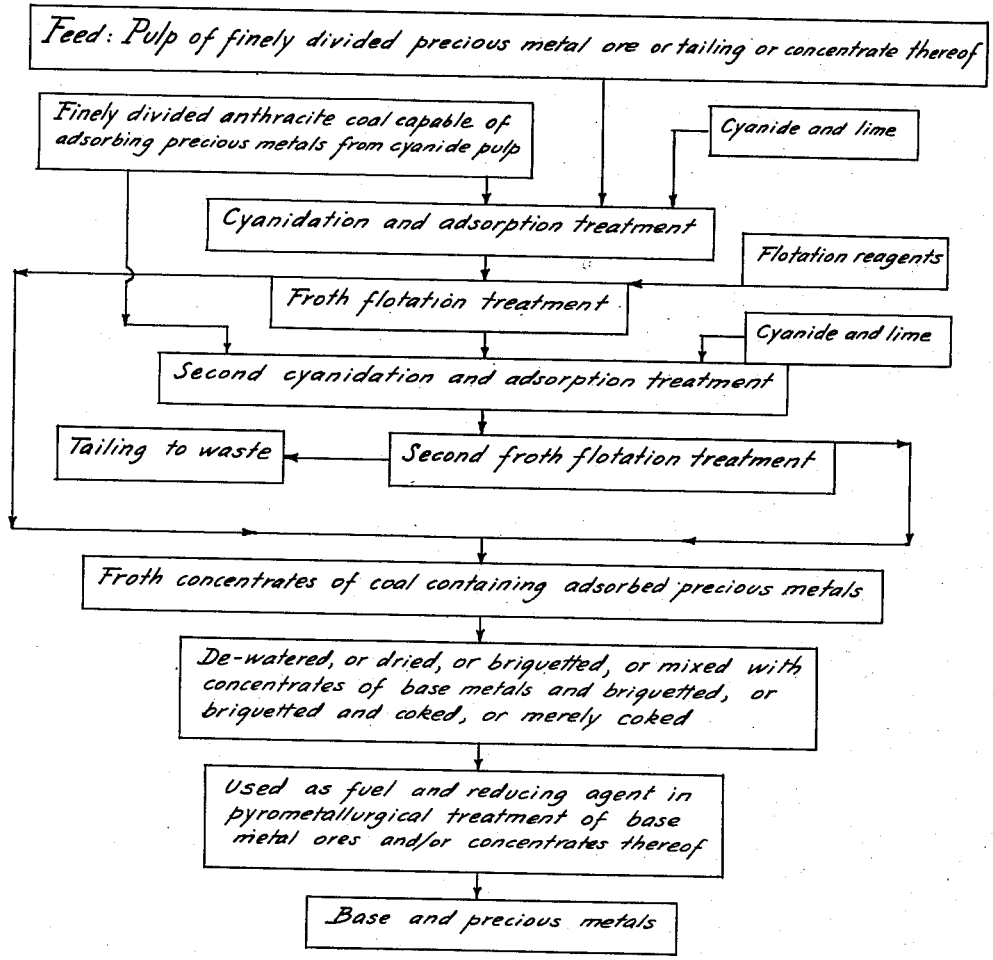
Fig. 2 is a simplified flow-sheet illustrating the invention utilizing finely-divided anthracite coal as the absorbent and fuel material, and providing for two cyanidation and adsorption treatments each followed by a flotation treatment.

Fig. 2 illustrates in simplified form a method embodying the invention, similar to that illustrated in Fig. 1 but using finely-divided anthracite coal and providing for two cyanidation and adsorption treatments and two flotation treatments. In the first stage, a rather thick pulp (about 40% solids by weight) is used, and most of the values are recovered. But some gold may be re-dissolved during subsequent flotation or washing through screens. The second stage cyanidation acts as a scavenger and is carried out in a rather thin pulp (25% solids) which is about the same dilution as in the final flotation of the fuel material loaded with precious metals. In this way the equilibrium between gold in solution and gold adsorbed by the fuel material is not disturbed by dilution, which might cause the re-dissolution of some of the gold in the cyanide solution. The froth concentrates of coal containing adsorbed precious metals obtained from both flotation treatments are combined and, after being dried, or filtered, or briquetted, or mixed with concentrates of base metals and briquetted, or briquetted and coked, or merely coked, are used as fuel and reducing agent in a pyro-metallurgical treatment of ores or concentrates of base metals for the recovery of said base and precious metals.

Figure 3:
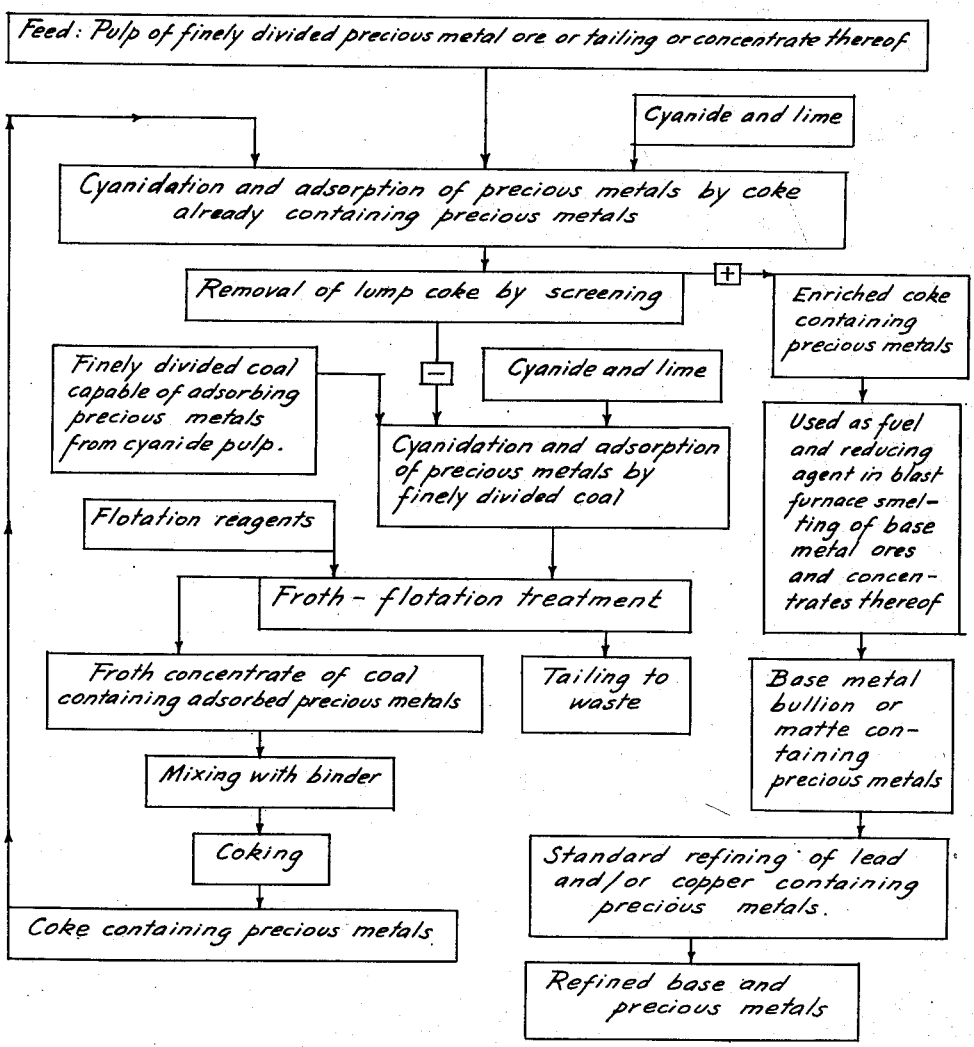
Fig. 3 is a simplified flow-sheet illustrating the invention embodied in a method in which finely-divided coal after adsorbing precious metals is coked and again used in its enriched state as an adsorbing material.

Fig. 3 illustrates in simplified form a method embodying the invention in which finely-divided coal, after adsorbing precious metals, is coked and again used in its enriched state as an adsorbing material. In this method, a feed consisting of a rather thick pulp (say about 40% solids by weight) of finely-divided precious metal ore or tailing or concentrate thereof is subjected to cyanidation with a cyanide and lime and to adsorption of the precious metals by coke (obtained as hereinafter described) already containing precious metals. The thus treated pulp is then subjected to a screening which results in the removal of the lumps of enriched coke containing precious metals. This coke is used as fuel and reducing agent in blast furnace smelting of base metal ores and concentrates, for recovery of said base and precious metals. The ore and any finer coke particles which pass through the screen are again subjected to cyanidation with cyanide and lime, this time in the form of a rather thin pulp (say 25% solids by weight), and to adsorption of precious metals by finely-divided coal capable of adsorbing precious metals from a cyanide pulp. After being thus subjected to a second cyanidation and adsorption treatment, suitable flotation reagents are added and the pulp is subjected, without further diluting it, to a froth-flotation treatment which results in a froth concentrate of fuel material containing adsorbed precious metals, and in a tailing which is sent to waste. Said froth concentrate is mixed with a binder and coked, thereby producing a coke containing precious metals which is used in the first cyanidation and adsorption treatment of the ore, as has been mentioned. It will of course be understood that this method is merely illustrative of how an enriched coke may be used as an adsorbing material in the practicing of the invention.

Figure 4:
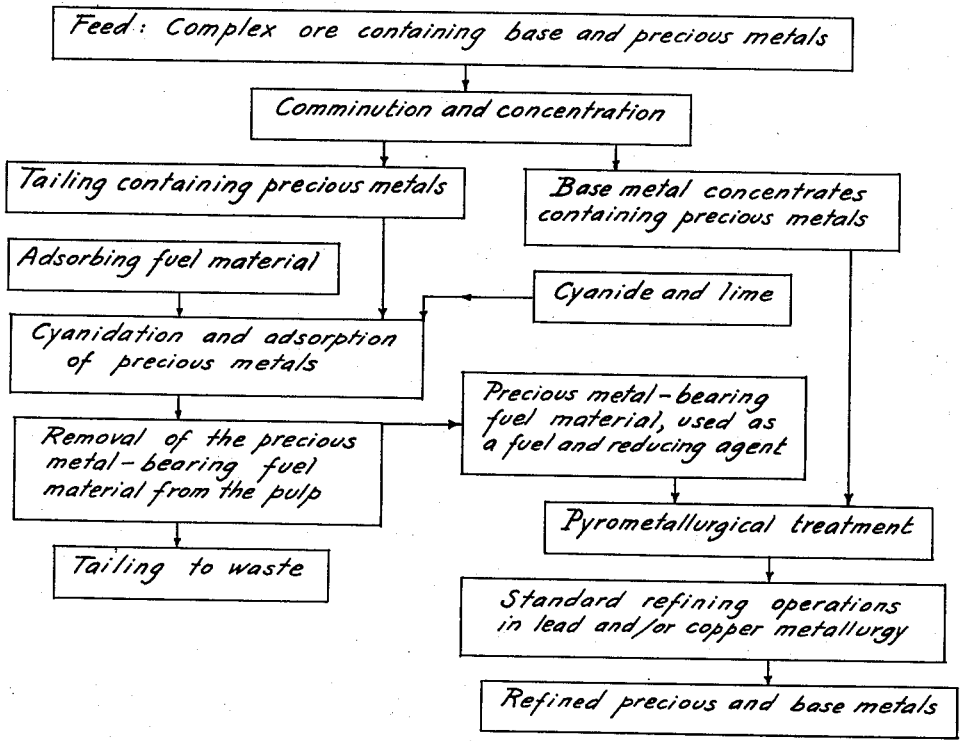
Fig. 4 is a simplified flow-sheet showing the invention applied to a complex ore containing both base and precious metals.

Fig. 4 illustrates in a simplified way how the invention may be applied to the treatment of complex ores containing base and precious metals. As will be apparent, the complex ores are subjected to comminution and concentration resulting in a concentrate of the base metals containing some of the precious metals, and a tailing containing the rest of the precious metals which is subjected to cyanidation and adsorption of the precious metals by a fuel material of the kind hereinbefore mentioned. Then the fuel material containing adsorbed precious metals is separated from the pulp, and subsequently used as fuel and reducing agent in a pyro-metallurgical treatment of the base metal concentrates (containing some precious metals) for the recovery of substantially all of the base and precious metals in the original complex ore.

Figure 5:
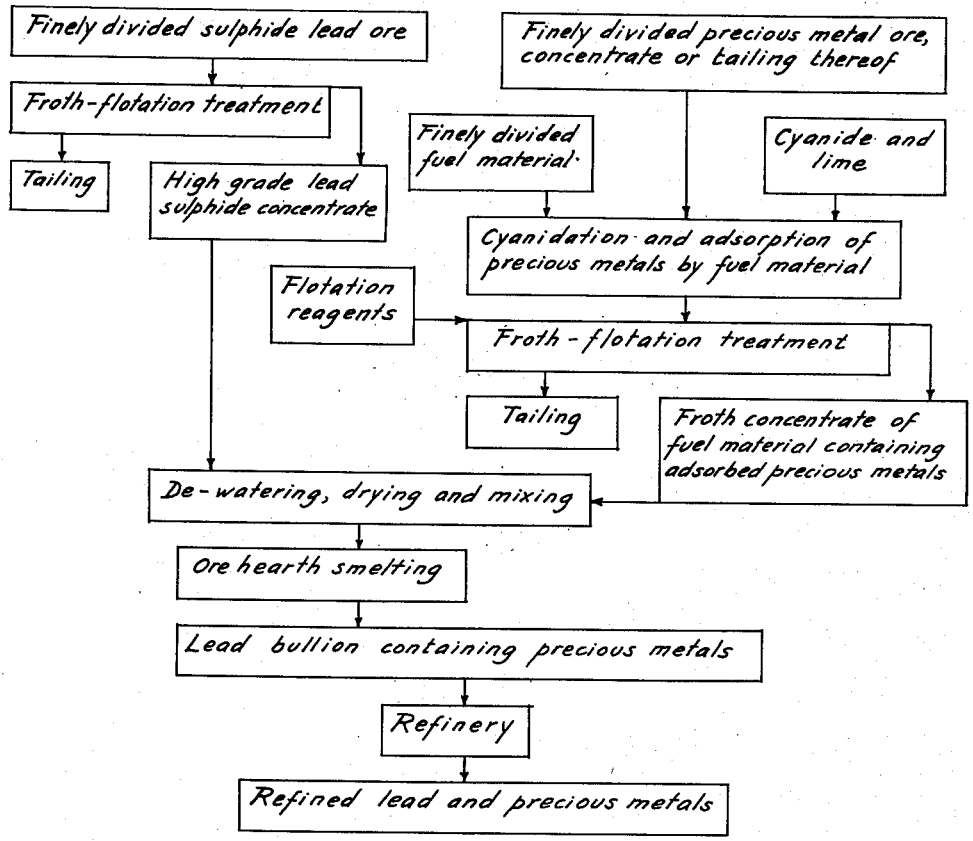
Fig. 5 is a simplified flow-sheet showing the invention applied to a precious metal ore and a sulfide lead ore.

Fig. 5 illustrates, in a simplified way, how the invention may be used in a joint operation on a sulphide lead ore and a finely-divided precious metal ore or tailing or concentrate thereof. As will be apparent, the finely-divided precious metal ore is subjected to cyanidation and adsorption of the precious metals by fuel material of the kind hereinbefore mentioned; after which by froth-flotation treatment a froth concentrate of the fuel material containing adsorbed precious metals is obtained. The sulphide lead ore is subjected to the usual flotation treatment resulting in a high grade lead concentrate. The concentrate of fuel material containing adsorbed precious metals and the lead concentrate are then combined, dried and subjected to ore-hearth smelting, thereby producing lead bullion containing precious metals which can be treated in a refinery in the usual way to obtain refined lead and precious metals.

Figure 6:
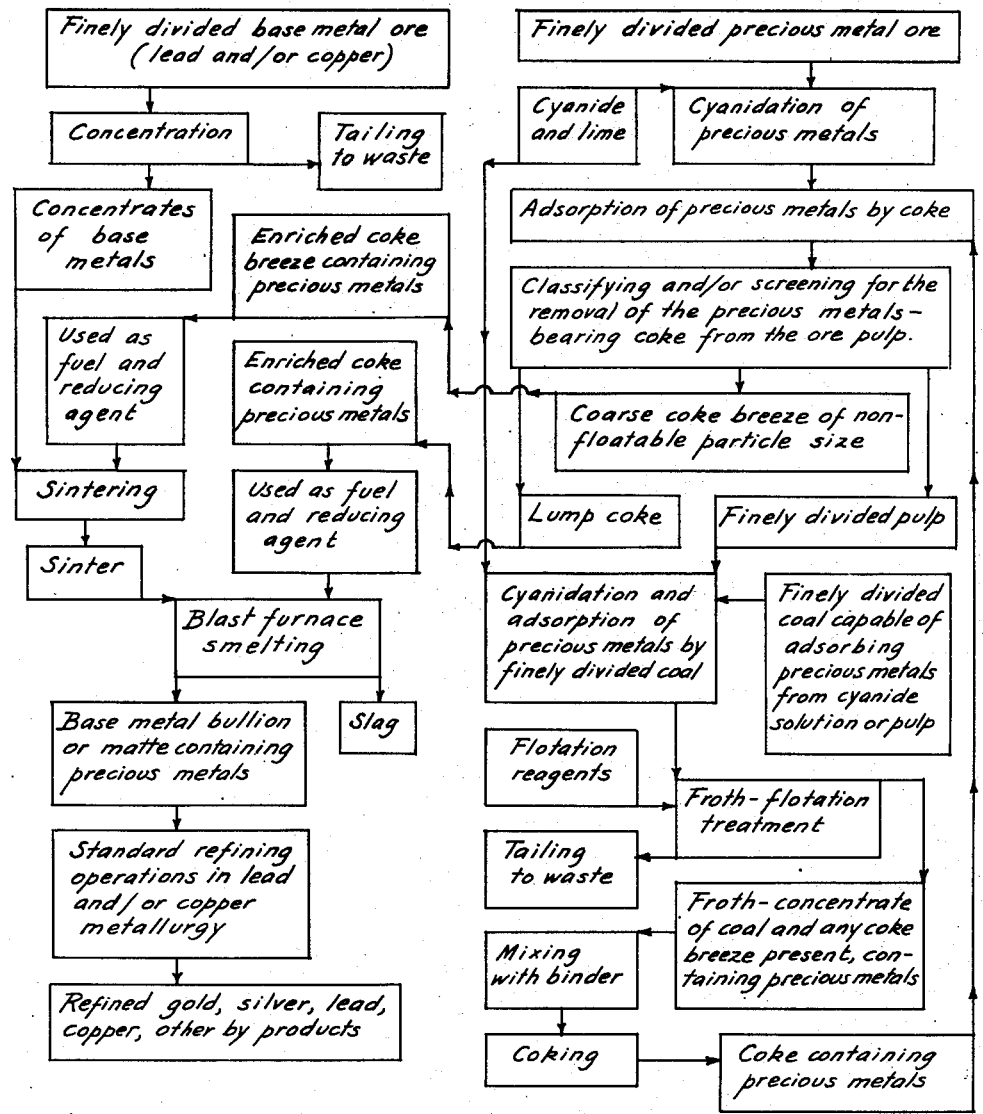
Fig. 6 is a simplified flow-sheet showing the invention applied to a precious metal ore and an ore of lead and/or copper.

Fig. 6 illustrates in a simplified way how the invention may be used in a joint operation on base metal ores (lead and copper) and precious metal ores. As will be apparent, the base metal ores are concentrated and the concentrates are sintered, and then smelted in a blast furnace using as a fuel in both of these pyro-metallurgical operations the precious metal-bearing coke breeze and coke, respectively, obtained (as hereinafter explained) after the cyanidation treatment of the precious metal ore. In this treatment the finely-divided pulp of the precious metal ore, is subjected to cyanidation with a cyanide and lime and to adsorption of the precious metals by coke (obtained as hereinafter described) already containing precious metals. This adsorption does not take place simultaneously with the dissolution, but after it in a separate operation which may be carried out in any apparatus providing a means for the separation of the coarse coke from the finely-divided pulp. In certain cases a classifier such as one of the usual spiral type may be used; or just a long, narrow and shallow tank provided with a moving screen, on top of which the coarse coke may form a bed like in a jig. In any case the pulp and the coke are fed and removed counter-currently to each other. That is, the pulp is fed at the end where the lump coke and coarse coke breeze are removed, and the coke is fed at the end where the pulp outlet is. The oversize product from the classifier or screen, is dried and passed over a grizzly (with an opening between bars of one inch or more), whereby the lump coke and the coke breeze are separated from each other. The enriched lump coke containing precious metals thus obtained is used (as before mentioned) as the fuel and reducing agent in the blast furnace smelting of the sintered base metal concentrates. The enriched coke breeze, going through the grizzly bars is used as fuel (as before mentioned) in the said sintering of the base metal concentrates. These or any similar arrangements make it possible to achieve in a continuous operation a multiple stage adsorption of precious metals, since the fresh coke adsorbs precious metals from a lean solution, while the enriched coke (at the other end of the tank or classifier), before being removed from contact with the pulp, meets richer precious metal cyanide solution. The net effect is that the enriched coke, just before being removed from the classifier or tank, is saturated by the precious metals of the incoming cyanide solution, which has then its maximum concentration in dissolved precious metals; while the fresh coke at the other end of the classifier or tank acts as a scavenger removing the last of the precious metals from the cyanide pulp, just prior to the removal of the latter from the classifier or tank. These examples merely illustrate two of the many possible practical mechanical ways of recovering lump and granular adsorbing fuel material from a cyanide pulp, when the adsorbing fuel material is used in a size range too coarse for flotation. Furthermore, they show how the principles involved in a multiple stage process can be advantageously utilized in a continuous operation, whenever it is desirable (and as far as it is economically convenient) in the practical applications of the methods embodying the present invention. Fig. 6 further indicates a treatment of the finely-divided pulp with any finely abraded coke breeze that may have remained in it. As shown, this pulp is subjected to another cyanidation (with newly added cyanide and lime) and to adsorption of the precious metals, this time by finely-divided coal of the kind before mentioned. After being thus subjected to a second cyanidation and adsorption treatment, suitable flotation reagents are added and the precious metal pulp is subjected to a froth-flotation treatment which results in a froth concentrate of the coal and any fine coke breeze that may have remained in the finely-divided pulp, both containing adsorbed precious metals; and in a tailing which is sent to waste. Said froth concentrate is mixed with a binder and coked, thereby producing a coke containing precious metals. This is the coke containing precious metals which is used in the first adsorption treatment of the ore as has been described. From the foregoing description it will be apparent that a joint operation on base metal and precious metal ores has resulted in the production of base metal bullion and/or matte containing precious metals which may be subjected to refining in the usual way. As may be noticed, the dissolution of the precious metals takes place with successive stage additions of fresh cyanide and lime, just as the adsorption takes place with the successive additions of adsorbing fuel materials; all of which benefits the efficiency of the dissolution and adsorption operations, by inducing a displacement of the double equilibrium existing between undissolved precious metals and dissolved ones on one hand, and between dissolved and adsorbed values on the other hand, in the desired direction; that is, towards the completion of the reaction, with maximum values adsorbed on the fuel material.

Fig. 7 illustrates in a simplified way how the invention may be used in the treatment of a pyritic gold ore containing carbonaceous gangue, to produce an enriched coke containing gold which is used as fuel and reducing agent in pyrometallurgical treatment of base metal ores and concentrates for recovery of said base metals and of the gold contained in the coke fuel. As will be apparent, the crudely ground gold ore is subjected to amalgamation and gravity concentration for the recovery of coarse gold in the usual way. The tailing containing some fine gold, pyrite and a carbonaceous gangue is subjected to a froth-flotation treatment for the joint recovery of the carbonaceous gangue material contained in the ore together with the auriferous pyrite. The froth concentrate containing auriferous pyrite and carbonaceous material is finely reground and subjected to cyanidation and adsorption by the finely-divided carbonaceous material contained in the concentrate, and by a finely-divided coal which is added in enough quantity to supplement the adsorbing capacity of the said carbonaceous material. This cyanide pulp is subjected to a froth-flotation treatment for the separation of the gold-bearing materials from the pyritic pulp; and the froth concentrate of precious metal-bearing carbonaceous material and coal thus obtained is mixed with a binder and coked. The resulting gold-bearing coke is used for the adsorption of residual gold in the cyanided tailing resulting from the flotation of the pyrite and carbonaceous gangue contained in the ore. After adsorption, the enriched coke is separated from the pulp and is used as fuel and reducing agent in pyro-metallurgical treatment of base metal ores and concentrates for the recovery of both said base metals and the gold contained in the fuel. It will be understood that Fig. 7 merely illustrates one of the possible ways in which the invention may be advantageously used in connection with the treatment of gold ores containing carbonaceous gangue.

In order to ascertain the relative adsorptive capacity of various fuel materials, a series of tests were made on anthracite coal from northern Peru, on ordinary charcoal sold in Lima, Peru, on imported English coke sold in Lima, Peru, and on impure graphitic coal from central Peru (the same coal that was used in the cyaniding tests hereinafter described and reported in Table II). A test was also made on coke made from impure graphitic coal already containing adsorbed gold. In the first four of these tests the fuel material was in finely-divided form (—65+150 mesh), and in all of the tests the fuel material was added to a 0.1% sodium cyanide solution containing about 0.1% lime (CaO) and 17 mg. of gold per liter. In each of the tests, five minutes was allowed for the adsorption of the gold by the fuel material from the cyanide solution. 5 parts of fuel material per 100 parts of solution by weight were used in these tests. The results of these tests are shown in the following table:

Table I

| Fuel Material Used as the Gold Adsorbent | Ounces of Gold Adsorbed per Ton of Fuel Material |
|---|---|
| Anthracite coal | 7.80 |
| Ordinary charcoal | 2.50 |
| Coke | 1.28 |
| Impure graphitic coal | 0.87 |
| Coke made from impure graphitic coal containing adsorbed gold [a] | 1.14 |

[a] Before the test this coke assayed about 1.3 ounces of gold per ton, so that after the test it assayed 1.3+1.14=2.4 ounces of gold per ton.

From the above data it will be apparent that the anthracite coal had the highest adsorptive power of the fuel materials tested. This supports the statement hereinbefore made that anthracite coal seems to be the best of the fuel materials mentioned in this specification as being useful in the practicing of the invention.

Laboratory tests of a method embodying the invention will now be described. The precious metal ore treated was a complex oxidized gold-silver-lead ore from the Chanchamina mine, of the Central Peruvian Andes, situated in the Chancha region (Tarma), containing 0.3 ounce of gold per ton, 5 ounces of silver per ton, and about 5% lead. The treatment of that ore was combined with the treatment of an oxidized rich lead ore from the Pichita mine, located in a neighboring area (San Ramon, Tarma), assaying about 50% lead and containing a little silver. The complex precious metal ore was first concentrated by flotation and tabling into a concentrate assaying 1.22 ounces of gold per ton, and 16.7 ounces of silver per ton. The concentrate obtained was later used in a smelting test as hereinafter described.

The resulting tailing, still containing about 0.13 ounce of gold per ton and 3.0 ounces of silver per ton was then subjected to cyanidation with about 3 pounds per ton cyanide and about 25 pounds per ton lime, and to adsorption of precious metals by a cheap finely-divided impure graphitic coal coming from the "Juanita" mine, situated in a neighboring locality (Huaracayo, Tarma), and containing over 50% ash. The amount of this coal which was used was about 10% by weight of the amount of the tailing treated. The cyanidation and adsorption treatment was performed in two stages, for a total time of about 48 hours. After each cyanidation and adsorption treatment, the pulp was subjected to a froth-flotation treatment for the separation of the enriched coal from the pulp, using pine oil as a collector-frother and sodium silicate as a dispersing agent. Good flotation conditions and clean concentrates were obtained easily. These combined concentrates assayed 1.3 ounces of gold per ton and 5.3 ounces of silver per ton. A portion of these concentrates was mixed with powdered asphalt (minus 48 mesh), using 20 parts of asphalt per 100 parts by weight of the precious metal-bearing coal concentrate, into a paste containing nearly 30% of water by weight; and this paste was coked at a temperature of less than 600° C. for about 1 hour, and a strong coke was thus obtained. This precious metal-bearing coke was suitable for use as a feed in a blast furnace treatment of base metal ores and concentrates. Moreover, the adsorption test, hereinbefore mentioned (see Table I), with such a coke, proved that it possessed capacity for further adsorption of precious metals from a cyanide solution. The metallurgical results of the above described operations are shown in the following table:

Table II

| | Weight, grams | Gold, oz./ton | Silver, oz./ton | Gold, grams | Silver, grams | Percent distrib. | |
|---|---|---|---|---|---|---|---|
| | | | | | | Gold | Silver |
| Base metals concentrate | 110.4 | 1.22 | 16.7 | 0.00461 | 0.06319 | 59.7 | 50.3 |
| Enriched graphitic coal concentrate | 65.4 | 1.33 | 5.3 | 0.00298 | 0.01197 | 38.5 | 9.5 |
| Total recovered | | | | 0.00759 | 0.07516 | 98.2 | 59.8 |
| Solution | (±3,000 cc.) | 0.001 | 0.021 | 0.00012 | 0.00216 | [a] 1.5 | [a] 1.7 |
| Tailing | 597.2 | 0.001 | 2.36 | 0.00002 | 0.04840 | 0.3 | [b] 38.5 |
| Total unrecovered | | | | 0.00014 | 0.05056 | 1.8 | 40.2 |
| Heads+added graphitic coal | 773.0 | | | 0.00773 | 0.12572 | 100.0 | 100.0 |

[a] The precious metals contained in the residual solution would not be completely lost in actual practice, because about ⅔ of this solution would be re-circulated in the cyaniding circuit.
[b] The silver not recovered was mostly the undissolved part of the same.

It will be understood that impure graphitic coal was used in this test as the adsorptive fuel material, because it was cheap and readily available. Although it has relatively low adsorptive power (as shown by Table I) and high ash content, it was found highly efficient for the purpose of adsorbing both gold and silver from solution, (as shown in Table II). Having thus demonstrated that this impure fuel material can be satisfactorily used, it is evident that other fuel materials such as anthracite coal, having higher adsorptive properties and much lower ash content, can also be used to advantage.

In order to prepare a representative sample for a smelting test, a portion of the precious metal-bearing graphitic coal-concentrate referred to in Table II was mixed in proportional amounts with the base and precious metal flotation concentrate already obtained and referred to in Table II; and with an amount of the previously mentioned rich oxidized lead ore equivalent to 1½ times the combined weight of the concentrates obtained from the complex precious metal ore. This produced a smelting charge totaling 150 grams of ore and concentrates (with no added reagents) as will be apparent from the following table:

*Table III*

| Smelting charge | Weight taken, grams | Gold, grams | Silver, grams | Lead, grams |
|---|---|---|---|---|
| Base metals concentrate | 36.8 | 0.00154 | 0.02107 | 2.57 |
| Enriched coal concentrate | 21.8 | 0.00099 | 0.00399 | 0.61 |
| Rich oxidized lead ore ᵃ | 91.4 | | 0.03800 | 45.80 |
| Total Smelting Test Charge | 150.0 | 0.00253 | 0.06306 | 48.98 |

ᵃ The sample of the rich lead ore that was used in the test assayed: Gold=Traces; Silver=12.12 oz./ton; Lead=50.1%.

The charge thus prepared was placed in a fire-clay crucible and subjected to smelting in an electric muffle furnace at more or less 1250° C. for about 2 hours. When the charge was removed from the furnace, complete smelting had taken place with the production of slag, iron matte and lead bullion. The metallurgical results were as follows:

*Table IV*

| Smelting Products | Weight, grams | Total Gold, grams | Total Silver, grams | Total Lead, grams |
|---|---|---|---|---|
| Lead bullion | 40.15 | 0.00246 | 0.05960 | 40.1 |
| Iron matte | 8.78 | 0.00014 | 0.00084 | |
| Total metals recovered | | 0.00260 | 0.06044 | 40.1 |
| Recoveries percent | | ᵃ 102.8 | 95.7 | ᵇ 82.1 |

ᵃ The recorded gold recovery was over 100% with respect to the direct assays of the charge ingredients, probably on account of the little gold contained in the rich lead ore (assumed as nil in the charge), and due to the fact that more gold is generally lost from the usual assay charges than under the conditions of the smelting test.
ᵇ The lead recovery was relatively low probably on account of the lead lost by volatilization under the conditions of the test.

The smelting charge, resulting from mixing the base metal concentrate and rich lead ore with the enriched graphitic coal concentrate, is in this particular case self-fluxing, self-collecting, self-reducing and self-fueling. This illustrates a desirable objective that it is feasible to attain through the methods of this invention.

It will be noted that in this test the enriched coal concentrate, obtained from the cyanidation treatment of the complex ores flotation tailings was sufficient as a reducing agent in the smelting of the base metal concentrate obtained from the same ore; and also provided enough reducing agent for the smelting of the oxidized lead ore. From well known data on the smelting art, it is possible to conclude that the amount of fuel provided by coking the adsorbing graphitic carbon in this case, would be sufficient for the smelting of both the base metal concentrate obtained from the Chanchamina's complex ore, and about a double amount of the Pichita's rich lead ore.

From the foregoing description it will be apparent that methods embodying the invention are advantageous in many respects. The possible field of application includes not only difficult slimy ores where filtration or settling are real problems; but also precious metal ores where other customary cyanidation methods, such as the ones employing counter-current decantation or filtration prior to zinc dust precipitation, can be satisfactorily applied too. This is so, because the present invention provides economies when used in combined operations with base-metal ores.

The double use of adsorbing fuel materials to adsorb precious metals during cyanidation, and as fuel and reducing agents during pyro-metallurgical operations, is an important feature of the new process, generally resulting in appreciable savings in operating costs. It permits achieving two fundamental objectives with only one basic expense for the low-priced adsorbing fuel material.

The methods of this invention make possible a greater capacity for the production of precious metals in blast furnace operation, since all the ingredients making up the smelting charge may contain precious metals, including the fuel utilized. This permits increased output of precious metals per ton of furnace capacity and per unit of time, for a given furnace.

In practicing the invention high metallurgical efficiencies are possible through the use of substantial quantities of fuel materials in the adsorption of precious metals from cyaniding pulps, which compensate advantageously for the relatively low adsorptive power of the said fuel materials; the pulp solutions discarded are practically barren in precious metal values.

It is an interesting fact that carbonaceous gangue materials existing in certain ores, generally considered deleterious in the cyanidation of said ores, not only have no injurious effects in the methods embodying the invention, but on the contrary they act as a part of the adsorbing fuel material that is later used as a substantial and important part of the fuel and reducing agent in pyro-metallurgical treatments of base metal ores; and, since the carbonaceous gangue materials already exist in the precious metal ore, the addition of less (or even no) fuel material is required and savings in the costs of the joint beneficiation of precious and base metals results.

In practicing the present invention, the flotation of precious metals-bearing fuel material from the cyanide pulp sometimes achieves the recovery with the fuel material of some floatable base metal values present in said pulp. When these base metals contain locked precious metal particles that have not been in contact with the cyanide solution, and hence would have not been recovered by prior cyanidation methods, the over-all extraction of precious metals will be appreciably increased. Furthermore, the base metals thus obtained, would add to the total values recoverable from the respective ores. (Notice lead content of the enriched coal concentrate in Table III.)

No especial de-sorption burning, clarifying, precipitating, filtering, melting or refining plant is needed for the final recovery of precious metals. Refined precious metals bullions result from the standard refining operations of lead and/or copper, which have to be performed anyway during the metallurgical treatment of these base metals. This results in further savings in the total capital and operating costs corresponding to the final recovery of the base and precious metals jointly treated by the methods embodying the present invention.

Only simple, standard metallurgical machinery is generally required for the successful application of the methods embodied in this invention.

What is claimed is:

1. The method of recovering in a joint operation on their respective ores precious metals such as gold and silver, and base metals such as lead, copper and zinc, which comprises subjecting an ore or tailing or concentrate of said precious metals to treatment in an alkaline pulp with a cyanide and with naturally-occurring low-volatile-matter coals having low adsorptive capacity for precious metals, of the group consisting of anthracite coal, impure graphitic coals, carbonaceous schists, coal shales and mixtures thereof, in quantity greater than 1% by weight of the precious metal ore and sufficient both to adsorb substantially all of the precious metals from said pulp and to serve as a substantial and important part of the fuel and reducing agent needed in the reduction of the base metal ore, removing the precious-metal-bearing coal from said pulp, and using said precious-metal-bearing coal as a substantial and important part of the fuel and reducing agent in a pyro-metallurgical treatment of an ore or concentrate of at least one of the said base metals for the joint recovery of said base and precious metals.

2. The method according to claim 1, in which said precious-metal-bearing coal constitutes substantially all of the fuel and reducing agent used in said pyro-metallurgical treatment.

3. The method according to claim 1, in which said low-volatile-matter coal is in a finely-divided state, and in which said precious-metal-bearing fuel material is removed from said pulp by froth-flotation concentration.

4. The method according to claim 1, in which said low-volatile-matter coal is in the form of lumps or granules, and in which the precious-metal-bearing fuel material is removed from said pulp by mechanical methods.

5. The method according to claim 1, in which said precious-metal-bearing coal is coked before being used as the fuel and reducing agent in said pyro-metallurgical treatment.

6. The method according to claim 1, in which said precious-metal-bearing coal is briquetted before being used as the fuel and reducing agent in the said pyro-metallurgical treatment.

7. The method according to claim 1, in which said precious-metal-bearing coal is briquetted and coked before being used as the fuel and reducing agent in the said pyro-metallurgical treatment.

8. The method of recovering jointly precious metals such as gold and silver, and base metals such as lead, copper and zinc which comprises subjecting an ore or tailing or concentrate of said precious metals to treatment in an alkaline pulp with a cyanide and a finely-divided low-volatile-matter coal of low absorptive capacity in quantity sufficient to adsorb substantially all of the precious metals, froth-floating the precious-metal-bearing coal from said pulp, coking said precious-metal-bearing coal, employing the said precious-metal-bearing coke thus obtained for the adsorption of more precious metal from a pulp of the kind mentioned, removing the said enriched coke from said pulp, and using the said enriched coke in such quantity as to constitute a substantial and important part of the fuel and reducing agent in a pyro-metallurgical treatment of ores or concentrates of said base metals for the joint recovery of said base and precious metals.

ALFONSO RIZO-PATRÓN R.

References Cited in the file of this patent

UNITED STATES PATENTS

| Number | Name | Date |
| --- | --- | --- |
| 560,997 | Hunicke | May 26, 1896 |
| 791,799 | Koneman | June 6, 1905 |
| 1,368,520 | Moore et al. | Feb. 15, 1921 |

OTHER REFERENCES

U. S. Bureau of Mines Technical Paper, No. 378 (1927), page 70. (Copy in Scientific Library.)